United States Statutory Invention Registration [19]

[11] Reg. Number: H924

Chimenti [43] Published: Jun. 4, 1991

[54] SIGNAL ANALYSIS IN LEAKY LAMB WAVE NDE TECHNIQUE

[75] Inventor: Dale E. Chimenti, Centerville, Ohio

[73] Assignee: The United States of America as represented by the Secretary of the Air Force, Washington, D.C.

[21] Appl. No.: 170,572

[22] Filed: Mar. 15, 1988

Related U.S. Application Data

[63] Continuation-in-part of Ser. No. 18,382, Feb. 24, 1987, abandoned.

[51] Int. Cl.[5] ..... G01N 9/24

[52] U.S. Cl. ..... 73/644; 73/602; 73/627

[58] Field of Search ..... 73/602, 627, 644

[56] References Cited

U.S. PATENT DOCUMENTS

| | | | |
|---|---|---|---|
| 2,995,925 | 8/1961 | Worlton | 73/627 |
| 3,120,120 | 2/1964 | Worlton et al. | 73/627 |
| 3,165,922 | 1/1965 | Worlton | 73/627 |
| 3,250,120 | 5/1966 | Dickinson, III | 73/67.6 |
| 3,512,400 | 5/1970 | Lynnworth | 73/67.5 |
| 3,572,099 | 3/1971 | Wieczorek | 73/602 |
| 3,813,926 | 6/1974 | Stubbeman | 73/627 |
| 4,100,808 | 7/1978 | Evans et al. | 73/588 |
| 4,111,053 | 9/1978 | Geithman et al. | 73/588 |
| 4,182,155 | 1/1980 | Fowler | 73/1 DV |
| 4,305,294 | 12/1981 | Vasile et al. | 73/579 |
| 4,325,255 | 4/1982 | Howard et al. | 73/290 V |
| 4,336,719 | 6/1982 | Lynnworth | 73/861.27 |
| 4,457,174 | 7/1984 | Bar-Cohen et al. | 73/598 |
| 4,494,408 | 1/1985 | DeLacy | 73/587 |
| 4,512,194 | 4/1985 | Beuter | 73/579 |
| 4,523,468 | 6/1985 | Derkacs et al. | 73/598 |
| 4,538,462 | 9/1985 | Hartog et al. | 73/577 |
| 4,577,503 | 3/1986 | Imaino et al. | 73/602 |
| 4,640,132 | 2/1987 | Flora et al. | 73/602 |
| 4,674,334 | 6/1987 | Chimenti et al. | 73/627 |

OTHER PUBLICATIONS

D. E. Chimenti et al, "Signal Analysis of Leaky Lamb Wave Spectra for NDE of Composites", in Proceedings of 1985 Ultrasonics Symposium (Apr. 18, 1986).

D. E. Chimenti et al, "Leaky Lamb Waves in Fibrous Composite Materials", in J. Appl. Phys. 58:12, 4531–38 (Dec. 1985).

D. E. Chimenti et al, "Anomalous Ultrasonic Dispersion in Fluid-Coupled, Fibrous Composite Plates", Appl. Phys. Lett. 49:9, 492–93 (Sep. 1986).

*Primary Examiner*—Linda J. Wallace

*Attorney, Agent, or Firm*—Bobby D. Scearce; Donald J. Singer

[57] ABSTRACT

A system and method for detecting defects in composite laminate material are described which comprise a first trtansducer for directing an ultrasonic beam of preselected frequency and tone burst excitation along a transmission axis through a sonic coupling bath onto a surface of the material at a preselected angle to generate Lamb waves in the material and leaky Lamb waves reflected therefrom, a frequency modulator for selectively modulating the frequency of the incident beam, and a second transducer for receiving the reflected sonic field including leaky Lamb waves reflected from the material and for providing a recovered and envelope-detected output signal corresponding to the amplitude of the reflected waves.

14 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIGNAL ANALYSIS IN LEAKY LAMB WAVE NDE TECHNIQUE

RIGHTS OF THE GOVERNMENT

The invention described herein may be manufactured and used by or for the Government of the United States for all governmental purposes without the payment of any royalty.

This application is a continuation-in-part of application Ser. No. 18,382, filed Feb. 24, 1987, now abandoned.

CROSS REFERENCE TO RELATED APPLICATION

The invention described herein is related to U.S. Pat. No. 4,674,334, dated June 23, 1987, granted on copending application Ser. No. 865,507 filed May 13, 1986, and entitled "Properties of Composite Laminates Using Leaky Lamb Waves".

BACKGROUND OF THE INVENTION

The present invention relates generally to nondestructive testing systems and methods using ultrasonics, and more particularly to improved system and method for nondestructive testing of composite laminates.

Composite materials, particularly fibrous composite laminates are of substantial interest to the aerospace industry for aircraft structural components by reason of high strength-to-weight ratios which characterize these materials. In the manufacture and use of composite materials, any of numerous performance limiting defects may arise within a composite structure, including delaminations, porosity, voids, ply gaps and overlaps, resin-rich and resin-lean regions, fiber misalignment, and cracks. Certain defects not detected in the laminate structure as manufactured may arise in the material during use. Nondestructive testing (NDT) methods in use heretofore for detection of the defects include x-ray radiography and ultrasonics in various modes such as pulse-echo and through-transmission. However, the inhomogeneous anisotropic structure which characterizes fibrous composites severely limits the suitability of conventional NDT methods for these materials.

According to the teachings of the cross reference, leaky Lamb waves may be used to detect and characterize defects in fibrous composite laminates, which defects may not be detectable using conventional NDT techniques. Leaky Lamb waves are excited in water-coupled composite laminate plates by ultrasonic isonification at appropriate angles and frequencies using a two transducer, pitch-catch geometry. The resulting leaky Lamb wave modes have minima which are characteristic of defects extant in the laminate including plate thickness, fiber volume fraction and resin content, variations of which within a few percent may not be significant or objectionable. The teachings and background material disclosed in the cross reference are incorporated here by reference.

The invention substantially solves certain shortcomings of existing NDT techniques and is a significant improvement over the teachings of the cross reference with respect to defect discrimination particularly in detection of delaminations and porosity in laminates with small local thickness variations. According to the invention, periodicity of leaky Lamb wave spectra, instead of single mode minima, provides a basis for the nondestructive evaluation of the laminate. The invention permits suppression of signals caused by changes in leaky Lamb wave mode structure resulting from small variations in laminate thickness, fiber volume fraction or resin content, but retains sensitivity to defects of interest, such as delaminations and porosity. In the practice of the invention, the frequency of a radio frequency (RF) tone burst is modulated over a range of from about 50 to 150% of the transducer center frequency at a rate of about 2 to 20 Hz. A frequency modulated tone burst is a gated radio-frequency signal where the radio-frequency is essentially constant within each individual burst, but where the radio-frequency changes slowly from burst to burst in a stepwise and periodic fashion. The modulation, after sonic interaction with the laminate, results in a time-domain signal, which varies nearly periodically at the output of a gated integrating amplifier. This output signal may in turn be filtered or processed in other manner to extract specific defect-related information, to detect sound material, and/or to suppress effects on the signal of small variations in test article thickness or fiber, volume fraction. Defects such as delaminations or porosity will change or disrupt the periodicity of mode excitation across the modulation band in a way that the effective repetition rate of the envelope-detected video signal, after interaction with the laminate, changes significantly in the presence of these flaws. Further signal processing, described below, allows the method to distinguish among flaws of various type and location in the laminate layup, but to ignore signal response from plate thickness changes at any preselected level of suppression.

It is therefore a principal object of the invention to provide an improved nondestructive evaluation system and method.

It is a further object of the invention to provide system and method for nondestructively testing composite materials.

It is another object of the invention to provide nondestructive testing system and method utilizing leaky Lamb waves.

It is another object of the invention to provide nondestructive system and method utilizing leaky Lamb waves and signal coding and decoding for distinguishing defects from small thickness variations in laminate material.

These and other objects of this invention will become apparent as the detailed description of representative embodiments proceeds.

SUMMARY OF THE INVENTION

In accordance with the foregoing principles and objects of the invention, system and method for detecting defects in composite laminate material are described which comprise a first transducer for directing an ultrasonic beam of preselected frequency and tone burst excitation along a transmission axis through a sonic coupling bath onto a surface of the material at a preselected angle to generate Lamb waves in the material and leaky Lamb waves reflected therefrom, a frequency modulator for selectively modulating the frequency of the incident beam, and a second transducer for receiving the reflected sonic field including leaky Lamb waves reflected from the material and for providing a recovered and envelope-detected output signal corresponding to the amplitude of the reflected waves.

DESCRIPTION OF THE DRAWINGS

The invention will be understood from the following description of representative embodiments thereof red in conjunction with the accompanying drawings wherein.

DETAILED DESCRIPTION

Theoretical discussions on layered and fibrous composite models and experimental measurements related hereto are given in "Leaky Lamb Waves in Fibrous Composite Laminates", by D. E. Chimenti and A. H. Nayfeh, J Appl Phys 58:12, 4531–38 (Dec. 15, 1985) and "Anomalous Ultrasonic Dispersion in Fluid-Coupled Fibrous Composite Plates", by D. E. Chimenti and A. H. Nayfeh, Appl Phys Lett 49:9, 492–93 (Sept. 1, 1986), which are incorporated by reference herein.

Figure 1:
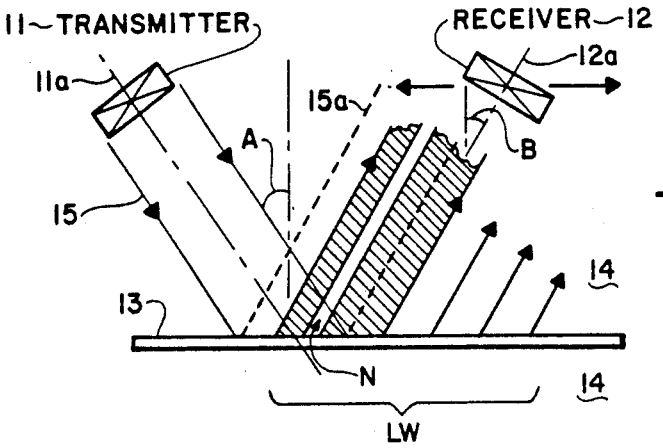
Fig. 1 PRIOR ART
FIG. 1 is a schematic of the system used in generation and detection of leaky Lamb waves according to the cross reference.
Figure 3:
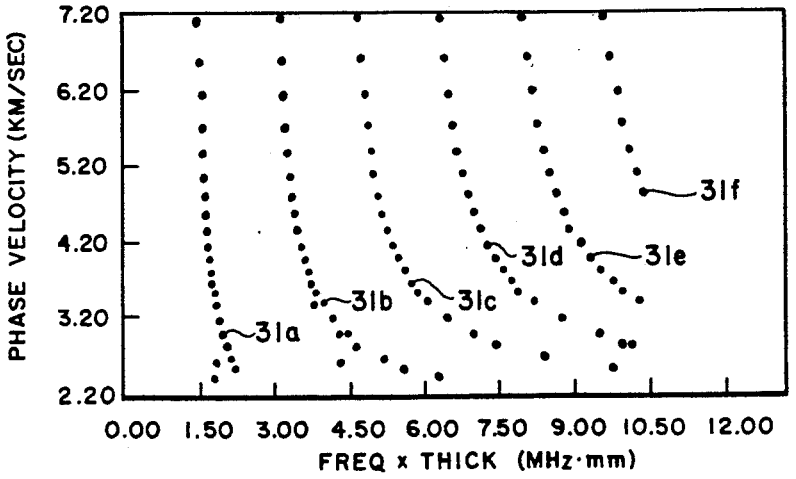
FIG. 3 presents representative experimental velocity dispersion curves of frequency times thickness versus phase velocity for a typical unidirectional graphite epoxy composite.

Referring now to the drawings, shown in FIG. 1 is a schematic of a system for leaky Lamb wave generation and detection for composite testing described in the cross reference. Ultrasonic transducers 11,12 are positioned over composite sample plate 13 within suitable sound coupling fluid 14 (e.g. water) so that the respective principal ultrasonic wave propagation axes 11*a*,12*a* define a plane perpendicular to plate 13 and intersect at a preselected point below the upper surface of plate 13; transducers 11,12 are movable relative to each other along the upper surface of plate 13 in order to position axes 11*a*,12*a* at appropriate angles for generation and detection of leaky Lamb waves. Transducer 11 transmits ultrasonic beam 15 of selected frequency of from about 0.5 to about 15 MHz along axis 11*a* at angle A preselected according to the specific material of plate 13 being examined; the range of angle A of from about 8° to 75° relative to a normal to plate 13 was found in the cross reference to be useful in the generation and detection of leaky Lamb waves in plate 13. Specular reflection of beam 15 from the surface of plate 13 is defined by dashed lines 15*a*. Leaky Lamb wave modes are identified by adjusting axes 11*a*,12*a* of transducers 11,12 to equal angles relative to vertical in a pitch-catch configuration. In the present invention, the transmitter transducer is driven by a frequency modulated RF tone burst. While it would be possible under restricted conditions to apply the method described herein using a continuous wave (CW) signal source, the clearly preferable embodiment of the invention exploits the advantages of tone burst excitation. These are: (1) the isolation of potentially disturbing echoes from surrounding structure or the fluid medium boundaries, (2) ready applicability of time-domain signal averaging techniques, (3) maintenance of quasi-CW excitation, permitting use of frequency-domain analysis. A suitable tone burst is about 10 to 200 microsec in duration at RF values of 1 to 20 MHz with a burst on/off duty factor of about 0.001 to 0.02. The reflected signal received by transducer 12 is acquired using a computerized area scanning system. Leaky Lamb waves generated by interaction of beam 15 with plate 13 are represented by the shaded region and the arrows in FIG. 1 in the region bearing the legend LW. According to teachings of the cross reference, interaction of the reflected component of appropriate wavelength and beam width results in a phase cancellation, manifested as a characteristic amplitude minimum or null zone N, which occurs within a fairly narrow range of wavelength and incidence angle. That is, the identification of Lamb modes is achieved by noting the occurrence of amplitude minima at particular incident angles and frequencies determined by the dispersion characteristics of the plate, viz. FIG. 3, as taught in the cross reference. Once leaky Lamb wave excitation is identified in a known defect-free plate, an appropriate scan is made at selected frequency with the transducers oriented to observe null zone N. The signal level at null zone N provides a sensitive measure of variations in the structure of plate 13 resulting from local changes of properties or from discontinuities and defects.

Figure 2:
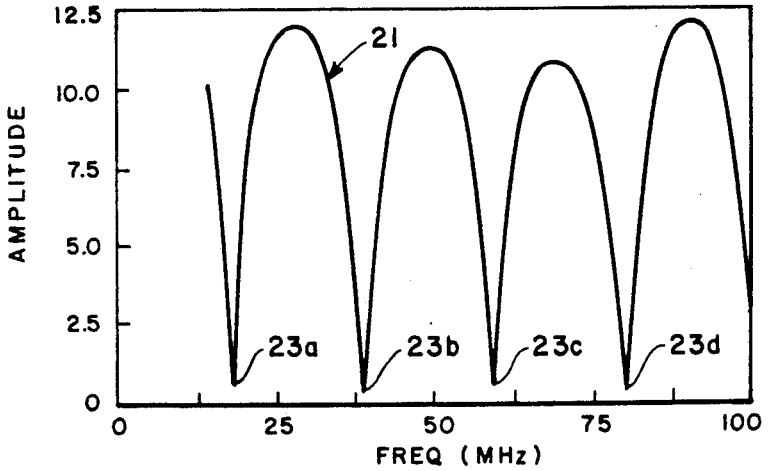
FIG. 2 is a plot of receiver signal versus frequency for a swept tone burst reflected from graphite epoxy composite at 22°.

Referring now to FIG. 2, shown therein is a plot 21 of receiver signal versus frequency for a swept-frequency tone burst reflected from 0.92 mm thick graphite epoxy plate at a 22° incidence angle; leaky Lamb wave modes correspond to the observed minima 23*a,b,c,d* and others at higher frequencies in the reflected field signal above the frequency spectrum shown.

Referring now to FIG. 3, shown therein are experimental velocity dispersion curves 31*a–f* of frequency times thickness versus phase velocity for a representative graphite epoxy composite. In accordance with a governing principle of the invention, it is seen from the plots of FIG. 3 that in the generation of leaky Lamb waves in this material, mode position is relatively insensitive to angle of incidence (i.e., phase velocity) for phase velocities near 5 km/sec, and occurrence of modes (i.e., minima) between about 3.5 and 7 km/sec is relatively periodic, which forms the basis for a signal coding and processing method taught in the invention and which permits insignificant thickness variations in the composite to be distinguished from other defects of interest.

Other materials having Lamb wave dispersion characteristics different from those illustrated in FIG. 3 may also benefit from the invention by application of the following general procedure for selecting a useful operating point. The angle of incidence should be preselected such that the wave phase velocity (equal to the quotient of the fluid velocity and the sine of the incident angle) falls approximately halfway between the transverse critical velocity and the longitudinal critical velocity in the material examined. Further the range of frequency sweep should be selected to include several Lamb wave modes for optimum discrimination potential. An approximate rule of thumb to make this selection is to compute the ratio of transverse wavespeed to plate thickness. The frequency range should then be no less than twice this ratio and may be centered at a frequency chosen for convenient operation of conventional transducers and associated electronics.

Figure 4:
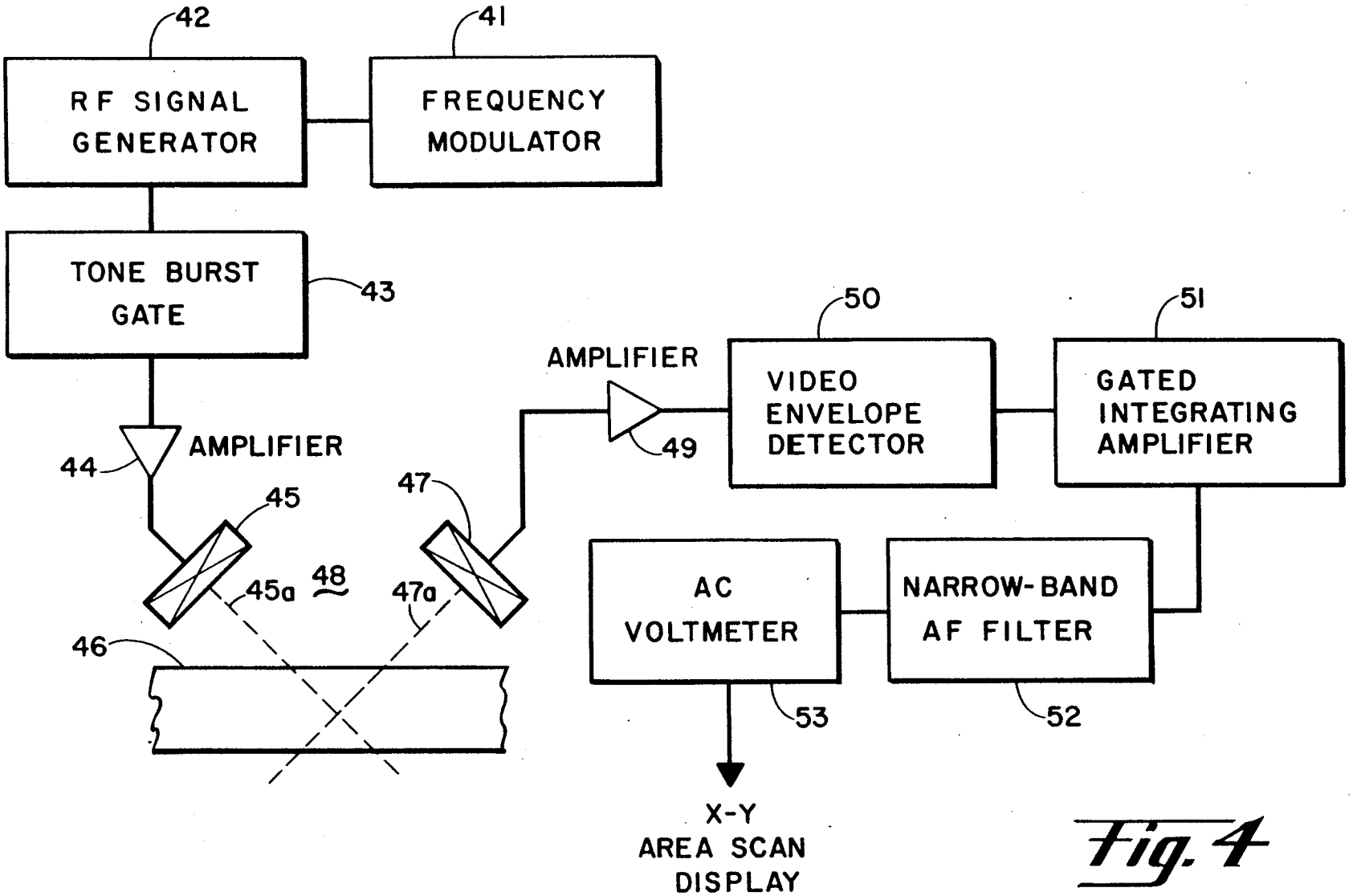
FIG. 4 is a block diagram of the system of the invention and useful in the practice of the method thereof.

Referring now to FIG. 4, shown therein is a block diagram of equipment useful in the practice of the method of the invention. Frequency modulator 41 is operatively connected to RF signal generator 42, which in turn passes the signal through RF gate 43, producing a frequency modulated tone burst of preselected burst length. This signal may be increased in amplifier 44, and it is then passed to transmitter transducer 45 having its sonic propagation axis 45*a* disposed with respect to laminate workpiece sample 46 at appropriate angle, as discussed above, for the generation of leaky Lamb waves; the reflected field is detected by receiver transducer 47 having its axis 47*a* oriented to sample 46 as with transducer 45. As suggested in FIG. 4, transducers 45,47 are further disposed relative to sample 46 such that axes 45*a*,47*a* intersect within sample 46 a preselected distance below the surface thereof. The equipment arrangement displayed in that portion of FIG. 4 including transducers 45,47 and workpiece sample 46 and including sound coupling medium 48 (e.g. water) is equivalent to the arrangement displayed in FIG. 1. The signal from transducer 47 is strengthened by amplifier 49, which is operatively connected to video envelope-detector 50, removing the RF content from the signal. The resultant RF envelope waveform passes to a gated integrating amplifier 51, which recovers the amplitude information from the video-detected tone burst. A narrow-band audio-frequency (AF) bandpass filter 52, whose preselected center frequency (preferably in the range of about 10 to 200 hz) is determined by the response function of the plate under test, allows selective suppression of unwanted signal information by passing only that signal information falling within a preselected bandwidth (about 1 to 50 Hz) corresponding to small variations in the rate of occurrence (dependent) on the thickness and elastic properties of the plate and the modulation frequency) of the sample-induced amplitude minima at filter 52. The filtered time-varying signal is measured with an integrating AC voltmeter 53 or equivalent signal processing means to provide an output corresponding to the observed defects in sample 46.

In the practice of the method of the invention, the frequency of the RF tone burst from transducer 45 is modulated over a range of about 50 to 150% of the center frequency of transducer 45 at a rate of from about 2 to about 20 Hz. The waveform with which the RF tone burst is frequency modulated may be selected by the skilled artisan guided by these teachings, a triangular waveform selected for demonstration of the invention being a preferred selection. This modulation produces a time-domain signal received by transducer 47 and analyzed by the receiver electronics which varies approximately periodically, depending on the nature and location of the leaky Lamb wave modes in the reflected field. Small thickness variations in sample 46 result in a proportionately small shift in the effective repetition rate of the signal received from transducer 47, whereas a delamination or porosity disrupts the mode excitation across the modulation band, and the repetition rate changes significantly. Selective bandpass filtering of the output signal and its detection by voltmeter 53 permits the system to distinguish between thickness variations and the stated defects of interest. It is understood that alternate means of frequency analysis of the detected waveform, such as digital signal processing, may be used to construct a pseudo-frequency spectrum in the AF range, upon which digital filtering or other suitable operations on the frequency domain information characteristic of a sample under examination can be performed to achieve the desired result.

The principle of the invention therefore is to exploit the relative periodicity of the generation of leaky Lamb waves especially in composites, instead of the individual mode excitation itself, to make manifest the presence of defects in the plate, while selectively discriminating against small property or thickness variations which are judged, before the fact, not to be significant. This method is accomplished by suitably coding and processing the signals directed at and received from the plate immersed in a fluid. Study of the dispersion characteristics of plates, especially composite plates, reveals an appropriate choice for signal coding and processing, indicated above, to achieve this end. Frequency modulation of the RF tone burst which excites the leaky Lamb waves produces at the receiving transducer 47 a nearly periodic, time-dependent signal. The information in this signal is utilized by first performing an envelope detection on the RF and sampling its level as a function of time, then bandpass filtering the sampled video. Alternatively, one sweep of the sampled video signal may be frequency analyzed to yield an AF spectrum. Small property or thickness variations have a proportionately small influence on the periodicity of the sampled video signal. A suitable choice for the pass band width of the filter allows the method to ignore such variations, while retaining sensitivity to defects of interest.

Figure 5:
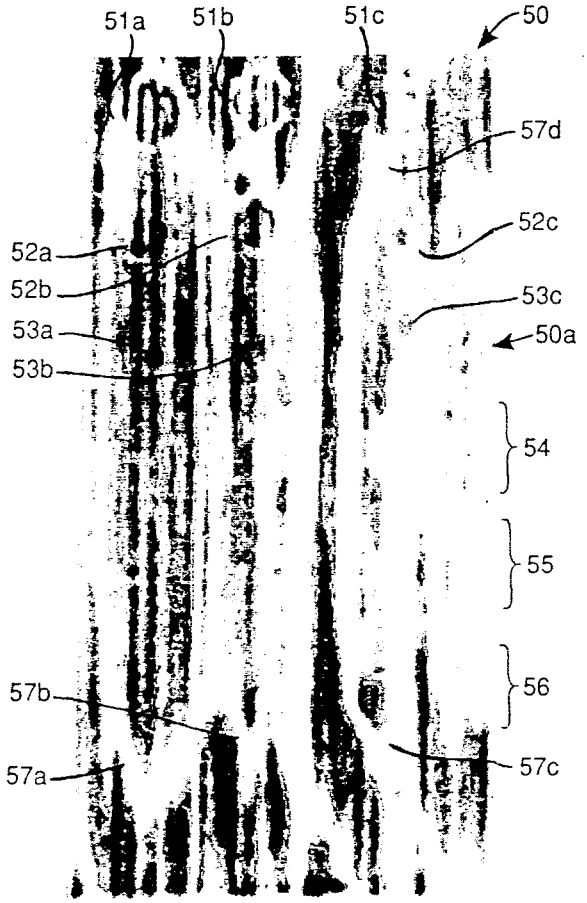
FIG. 5 is a leaky Lamb wave C-scan of 28×14 cm composite 4.5 mm thick with embedded defects using no frequency modulation.
Figure 6:
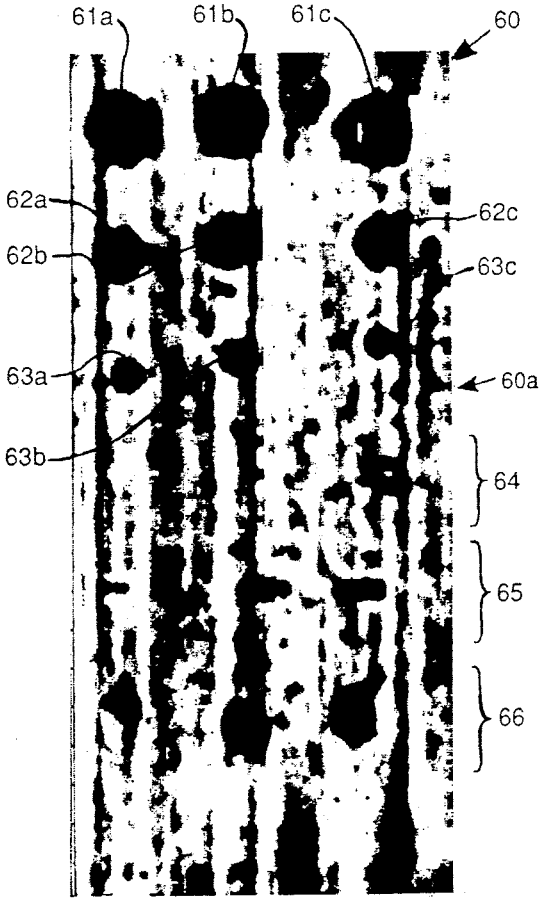
FIG. 6 is a two-dimensional scan of the material of FIG. 5 using tone burst excitation frequency modulation, and audio-frequency filtering according to the invention.

Referring now to FIGS. 5 and 6, shown in FIG. 5 is a leaky Lamb wave C-scan 50 of 28×14 cm composite sample 4.5 mm thick with embedded defects; the scan was taken using a constant RF tone burst frequency (no frequency modulation). FIG. 6 is a corresponding C-scan 60 of the same material of FIG. 5 taken according to the method of the invention using 10 Hz tone burst modulation over 75% of the center frequency (2.2 Hz) of the incident beam. Transducers 45,47 of the system depicted in FIG. 4 were scanned in tandem across the sample to obtain the data shown in the respective C-scans of FIGS. 5 and 6. The material of FIGS. 5,6 was type AS4/3501-6 with (0)32 lay-up. Controlled defects in the sample included double layers of Teflon® wafers 12.7 microns thick three such double wafers being embedded between layers 8 and 9, 16 and 17, and 24 and 25. Porosity was simulated using glass microspheres with an average diameter of 40 microns and shell thickness of about 2 microns embedded between layers of the composite sample. Resin rich regions were simulated by 6.4 mm cuts through two successive plies. Interaction of the ultrasonic beam with the sample results in a spatial variation of the plate boundary conditions, changing the degree of excitation or frequency of generated Lamb modes at the defect locations. In the upper portion of each of FIGS. 5,6 are three simulated delaminations 51*a–c*,61*a–c* each 25 mm in diameter, located farthest to nearest the isonified (upper) surface 50*a*,60*a* of the sample as FIGS. 5,6 are viewed from left to right. The next two rows contain successively smaller delaminations 52*a–c*,62*a–c* and 53*a–c*,63*a–c*. Next below are two rows of resin rich areas 54,55,64,65 followed by a rows 56,66 of simulated porosity. It is evident from FIG. 5 that some defects were detected without frequency modulation, but many defects are either only weakly observed or not detected at all. In addition, it is clear that other larger scale variations, such as indicated at 57*a–d*, resulting from thickness variations are registered, which substantially obscure defects of interest because they shift slightly the condition for excitation of the leaky Lamb waves.

In contrast, C-scan 60 of FIG. 6, wherein the same sample was examined using tone burst excitation and frequency modulation of the invention, clearly shows all nine delaminations 61*a–c*,62*a–c*,63*a–c*, and the resin rich regions 64*a,b*,65*a,b toward* the right side of the scan. The microporosity 66 near the bottom of C-scan 60 is observable when close to insonified surface 60*a*, but is lesser defined in the sample center or remote of surface 60*a*. The heavy vertical striations are ply drops or gaps, which are obscured in scan 50 but are prominent in scan 60. The less pronounced vertical features may be attributed to unevenly dispersed tow bundles in the sample.

The invention provides an improved nondestructive evaluation method utilizing the generation and detection of leaky Lamb waves in composite laminates utilizing tone burst excitation and frequency modulation of incident ultrasonic energy in the laminate. It is understood that certain modifications to the invention as described may be made, as might occur to one with skill in the field of the invention, within the scope of the appended claims. All embodiments contemplated herein which achieve the objects of the invention have therefore not been shown in complete detail. Other embodiments may be developed without departing from the spirit of the invention or from the scope of the appended claims.

I claim:

1. A system for detecting defects in composite laminate material, comprising:

(a) first transducer means for directing an ultrasonic beam of preselected frequency along a transmission axis onto a surface of a laminate material at preselected angle to generate Lamb waves in said material and leaky Lamb waves reflected from said surface of said material;

(b) means for exciting said first transducer means with a radio frequency tone burst having preselected burst length and preselected on-off duty factor;

(c) second transducer means for receiving said leaky Lamb waves reflected from said material along a reflection axis and for providing an output signal corresponding to the amplitude of the reflected waves received by said second transducer means;

(d) means for recovering radio frequency signal amplitude information from said output resulting from the tone burst excitation of said first transducer means;

(e) said first transducer means and said second transducer means each disposed in preselected spaced relationship to said surface of said material and to each other such that said transmission axis and said reflection axis intersect within said material a preselected distance below said surface; and (f) fluid means for sonically coupling said material with said first transducer means and said second transducer means.

2. The system of claim 1 further comprising means for selectively positioning said first transducer means and said second transducer means along said surface of said material in said spaced relationship.

3. The system of claim 1 wherein said fluid means for sonic coupling of said material and said first transducer means and said second transducer means comprises water.

4. The system of claim 1 wherein said preselected frequency is in the range of from about 0.5 to about 15 MHz.

5. The system of claim 4 wherein said preselected angle is in the range of from about 8° to about 75° relative to a normal to said surface of material.

6. The system of claim 1 wherein said preselected burst length is from about 10 to about 200 microseconds.

7. The system of claim 1 wherein said preselected on-off duty factor is from about 0.001 to about 0.20.

8. The system of claim 1 wherein said means for recovering radio frequency amplitude information comprises a gated integrating amplifier.

9. A method for directing defects in composite laminate material, comprising the steps of:

(a) directing an ultrasonic beam of preselected frequency along a selected transmission axis through a fluid sonic coupling bath onto a surface of a laminate material at preselected angle to generate Lamb waves in said material and leaky Lamb waves reflected from said surface of said leaky material;

(b) gating said preselected frequency to produce a radio frequency tone burst excitation directed along said selected transmission axis;

(c) modulating said frequency of said beam over a preselected percentage range of said frequency at preselected modulating rate;

(d) receiving said leaky Lamb waves reflected from said surface of said material along a reflection axis intersecting said transmission axis within said material at a preselected distance below said surface, and providing an output signal corresponding to the amplitude of the reflected waves; and (e) envelope detecting said output signal to remove radio frequency content thereof.

10. The method of claim 9 further comprising the step of (f) audio-frequency filtering said output signal to effect a preselected level of suppression of unwanted signal information.

11. The method of claim 10 further including the step of selectively positioning said first transducer means and said second transducer means along said surface of said material for performing steps of (a) through (f) at a plurality of locations along said surface.

12. The method of claim 9 wherein said preselected frequency is in the range of from about 0.5 to about 15 MHz.

13. The method of claim 12 wherein said preselected angle is in the range of from about 8° to about 75° relative to a normal to said surface of said material.

14. The method of claim 9 wherein said fluid sonic coupling bath comprises water.

* * * * *